V. O. & J. R. Spencer,
Cage Trap,
N° 27,080.  Patented Feb. 7, 1860.
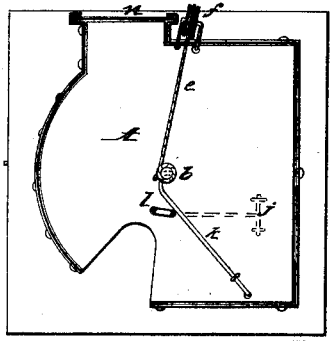
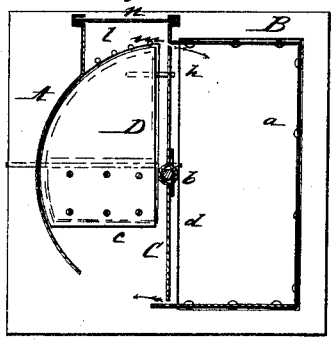
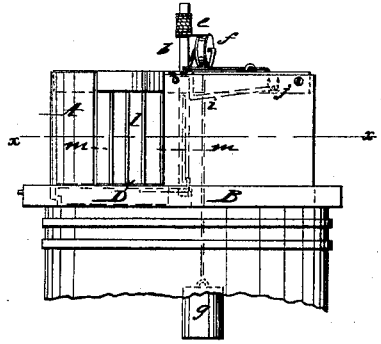
Witnesses:
R. S. Spencer
J. W. Coombs
Inventors:
V. O. Spencer
J. R. Spencer
per Munn & Co. Attorneys

UNITED STATES PATENT OFFICE.

V. O. SPENCER AND J. R. SPENCER, OF MANSFIELD, PENNSYLVANIA.

ANIMAL-TRAP.

Specification of Letters Patent No. 27,080, dated February 7, 1860.

*To all whom it may concern:*

Be it known that we, V. O. SPENCER and J. R. SPENCER, both of Mansfield, in the county of Tioga and State of Pennsylvania, have invented a new and Improved Animal Trap; and we do hereby declare that the following is a full, clear, and exact description of the same, reference being had to the annexed drawings, making a part of this specification, in which—

Figure 1 is a plan or top view of our invention. Fig. 2, a horizontal section of the same taken in the line $x, x$, Fig. 3. Fig. 3, a front elevation of ditto.

Similar letters of reference indicate corresponding parts in the several figures.

This invention relates to an improved self setting trap, and is more especially designed for catching rats and mice.

The invention consists in the employment or use of a revolving partition placed within a suitable box and provided with a treadle-catch, bait-box, and a discharge opening, substantially as hereinafter fully shown and described whereby the device may be placed over a barrel or other suitable vessel, containing water, and the animals not only entrapped but destroyed at the same time; the trap setting itself after each operation of entrapping.

To enable those skilled in the art to fully understand and construct our invention, we will proceed to describe it.

A represents a box which may be constructed of sheet metal or wood. This box is fitted on a base B through which an opening $a$ is made, said opening being within the box A, as shown clearly in Fig. 2. Within the box A, at its center a vertical shaft $b$ is placed said shaft passing through a partition C which divides the box A, into two compartments $c\ d$ as shown in Fig. 2. The shaft $b$ and partition C are allowed to rotate freely within the box A. The shaft $b$ projects upward through the top of the box A, and has a rope or cord $e$ wound around it, said cord passing over a pulley $f$ and having a weight $g$, attached to its end. The weight and cord have a tendency to rotate the partition C, but the latter is held by means of a catch $h$, which is attached to one side of a spring treadle or platform D, at the back part of the compartment $c$.

The opening $a$ in the bottom G of the box A, is within the compartment $d$ as shown clearly in Fig. 2, and in the top of the box there is placed a catch $i$ which prevents the rotation of the partition C in the wrong direction. This catch is simply a bent rod of the form shown clearly by the dotted line in Fig. 3, the rod working freely on a small shaft $j$, as shown clearly by the dotted lines in Fig. 1. The shaft $b$, is notched at its upper part to receive the end of a pawl $k$, which is attached to the top of the box A.

At the back part of the compartment $a$, of the box A there is a bait-box $l$ which is divided from the compartment $a$ by bars $m$. This bait box has a glass slide $n$ for its outer side in order to admit light and render the bait in the box $l$ distinctly visible.

The base B of the box A is sufficiently large to cover the barrel or other vessel on which it is placed. The bait is placed in box $l$, the cord $e$, wound around the shaft $b$, and the trap is set ready for operation. An opening or entrance $o$ is made in the front end of the compartment $c$ of the box A, through which entrance the animal enters, attracted by the bait in box $l$, and when the animal is on the treadle or platform D, its weight will depress the platform and the catch $h$, and the weight and cord $g$, $e$, will rotate the partition C, just half a revolution, the animal by said movement of the partition being thrown into the compartment $d$, and consequently falling through the opening $a$ into the water in the receptacle below. As soon as the animal is thrown off the platform the latter by its elasticity rises and the catch $h$, arrests the rotation of the partition C, when it completes a half revolution and arrives at its previous or original position. The trap consequently is set ready for a succeeding operation. When the weight $g$ is run down the cord $e$ is again wound on the shaft $b$. The cord may be of sufficient length to admit of many operations or half revolutions of the partition C. It will be seen that the bait in the box $l$ remains untouched, as the animal actuates the catch $h$ before the bait is reached.

We are aware that rotating partitions have been placed within boxes for the purpose of forming self-setting traps, but we are not aware that a partition has ever been placed within a box and arranged so as to divide the box into two compartments, one provided with an opening at its bottom or rather with no bottom at all, and the other having a spring treadle and catch, and a bait box communicating with it.

We do not claim therefore any of the within described parts separately; but,

We do claim as new and desire to secure by Letters Patent—

The revolving partition C, within box A actuated by the cord and weight or its equivalent; the spring treadle or platform D, with catch $h$ attached, the bait box $l$, and the opening $a$ in the compartment $d$, the whole being combined and arranged as and forth the purposes specified.

V. O. SPENCER.
J. R. SPENCER.

Witnesses:
F. M. SPENCER,
C. R. SPENCER.